United States Patent [19]

Durenec et al.

[11] 4,383,548
[45] May 17, 1983

[54] EVACUATING-CHARGING VALVE ASSEMBLY

[75] Inventors: Peter Durenec, Annandale; Aubrey J. Dunn, Springfield, both of Va.

[73] Assignee: The United States of America as represented by the Secretary of the Army, Washington, D.C.

[21] Appl. No.: 335,926

[22] Filed: Dec. 30, 1981

[51] Int. Cl.³ .................. F16K 43/00; F16K 31/44
[52] U.S. Cl. .................. 137/321; 251/216; 251/291; 251/319
[58] Field of Search .......... 137/232, 233, 234, 317, 137/319, 320, 321, 328; 251/216, 217, 218, 291, 318

[56] References Cited

U.S. PATENT DOCUMENTS

| | | | |
|---|---|---|---|
| 586,534 | 7/1897 | Pickett | 137/234 |
| 1,328,980 | 1/1920 | Benjamin | 137/319 |
| 1,830,894 | 11/1931 | Ullstrand et al. | 137/319 |
| 1,848,691 | 3/1932 | Beach | 251/291 |
| 3,552,421 | 1/1971 | Yocum | 137/321 |

*Primary Examiner*—George L. Walton
*Attorney, Agent, or Firm*—Nathan Edelberg; Milton W. Lee; Aubrey J. Dunn

[57] ABSTRACT

An evacuating-charging valve assembly consisting of a valve permanently mountable onto a fluid system such as an air conditioning system and a connecting head temporarily attachable to the valve. Two embodiments are shown, in both of which the valve has a flange portion for mounting to the fluid system, and a boss portion. Each boss portion is internally bored and threaded and has a ball-ended setscrew, with the ball against the end of a hole through the flange. In one embodiment, the setscrew has slots through its threads, and the connecting head screws into the boss. In the other embodiment, holes are bored through the boss and the connected head screws onto external threads on the boss. Both connecting heads have a setscrew wrench inside, and an external knob for rotating or linearly moving the wrench, and have passageways through them to an external hose connection. When the setscrews are unscrewed, a fluid passageway exists between the hole through the flange and the external hose connection.

1 Claim, 5 Drawing Figures

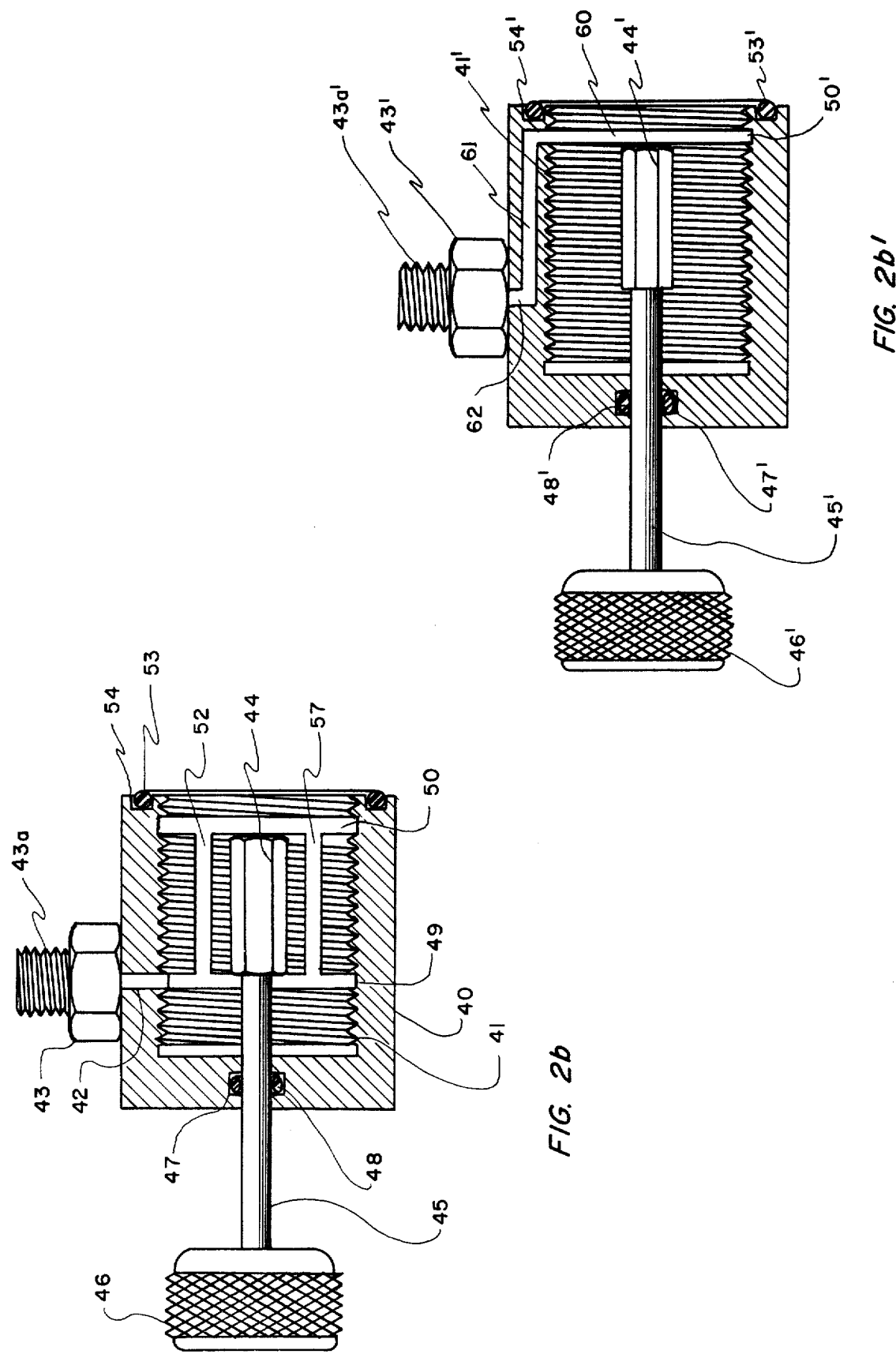

EVACUATING-CHARGING VALVE ASSEMBLY

The invention described herein may be manufactured, used, and licensed by the U.S. Government for governmental purposes without the payment of any royalties thereon.

BACKGROUND OF THE INVENTION

This invention is in the field of charging or evacuating valves for hydraulic, pneumatic, or refrigeration systems. A well-known type of such valve is the Schrader valve. Perhaps the best known use of the Schrader valve is an automobile (and other pneumatic) tires; it is also common to home and automobile air conditioning systems. Although the Schrader valve has certain advantages, there are places where it is unacceptable. A typical such place is a system using gaseous helium; another is a system operating at a high temperature; yet another is a system using a fluid incompatible with the rubber seat of a Schrader valve.

SUMMARY OF THE INVENTION

The invention is a evacuating/charging valve for a fluid system and the connector head for use with the valve. Two embodiments of the invention are presented and share some common features. Specifically, in both embodiments the valve consists of a flange portion for mounting to a fluid system and a boss portion, with a ball-point setscrew in a threaded bore in the boss portion. The ball of the setscrew, when seated, seals a bore through the flange portion. In one embodiment, the setscrew has longitudinal slots on its outer surface that communicate with the outer end of the bore in the boss portion when the setscrew is unseated. In the other embodiment, transverse bores through the boss portion communicate between the threaded outer surface of the boss and the flange bore when the setscrew is unseated. For both embodiments, the connector head has a body adapted for threadably attaching to the boss of the valve, has a slidable setscrew wrench therein, and has openings to an external connection fitting. In the one embodiment, the connector head has a portion which screws into the boss bore and clearance between the setscrew wrench and the bore containing the wrench, such that a passageway exists from the setscrew seat to the external connection fitting. In the other embodiment, the connector head screws onto the threaded outer boss surface and has bores and/or grooves therein communicating to an external connection fitting, such that a passageway exists from the setscrew seat to the external connection fitting.

BRIEF DESCRIPTION OF THE DRAWINGS

FIG. 2b is the sectional view of the connector head for this embodiment;

FIG. 2b' shows a sectional view of a variation of FIG. 2b.

DESCRIPTION OF THE PREFERRED EMBODIMENT

Figure 1B:
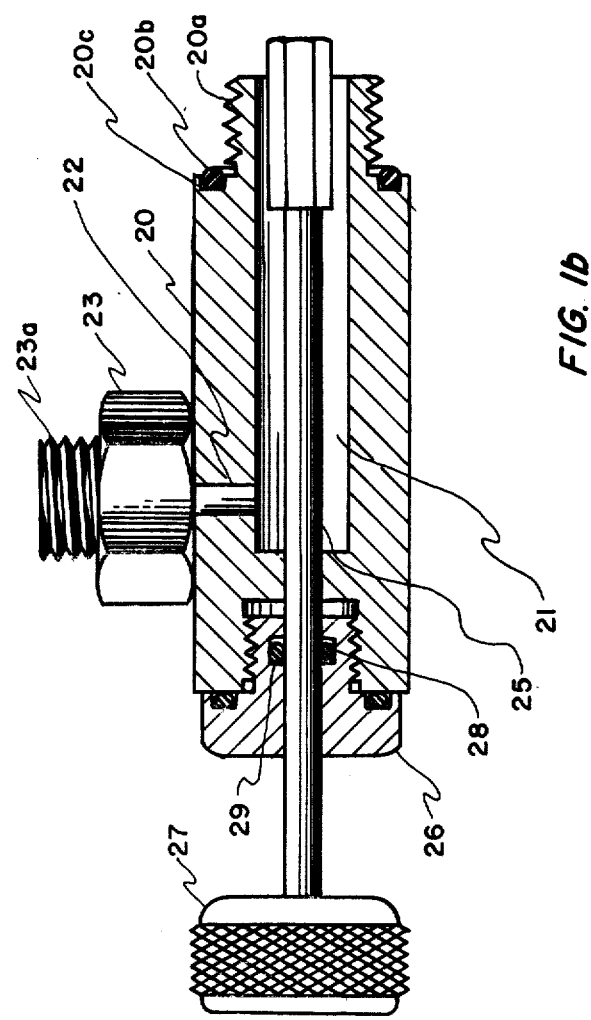
FIG. 1b is sectional view of the connector head for this embodiment.
Figure 1A:
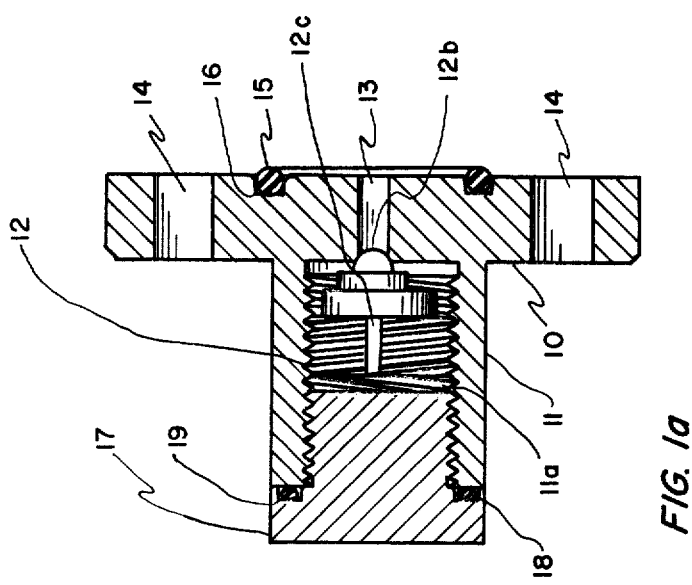
FIG. 1a shows a sectional view of the valve for one embodiment of the invention.

The invention may be best understood if this description is taken in conjunction with the drawings, in which FIGS. 1a and 1b show an embodiment of the invention including a valve in FIG. 1a and a connector head in FIG. 1b. Referring now to FIG. 1a, numeral 10 designates the flange portion of the valve, and 11 designates the boss portion. Boss 11 is bored and threaded at 11a to accept setscrew 12. This setscrew has a socket end 12a into which a hexagonal (or other shape) wrench may fit, has ball end 12b, and has one or more longitudinal slots 12c cut through its threads. Ball end 12b of setscrew 12 seats against one end of bore 13 in flange 10. This flange is adapted for mounting to a fluid system by bolt holes 14 and seal 15 in groove 16. It should be understood that the valve may be mounted to a fluid system by various other means or techniques. Specifically, all of 14, 15, and 16 may be omitted and 10 may be welded or brazed to some part of the fluid system. Alternatively, 10 may be replaced by a threaded portion and this portion may be screwed into a threaded bore a fluid system. Plug 17 with seal 18 in groove 19 is normally used to close the threaded bore in boss 11. The manner in which the valve is used will be set forth in conjunction with the FIG. 1b description below.

FIG. 1b shows a connector head having body 20 with threaded portion 20a, and seal 20b in groove 20c. Within 20 is bore 21. Bore 22 goes through the wall of 20 and through external connection fitting 23 with threaded portion 23a. Inside of bore 21 is setscrew (socket) wrench 24 carried by shaft 25. This shaft passes through a bore in threaded plug 26 screwed into body 20. The opposite end of shaft 25 from wrench 24 carries knob 27. Around shaft 25 is seal 28 in groove 29.

The connector head of FIG. 1b is used with the valve of FIG. 1a as follows: plug 17 is removed from the threaded bore 11a. Knob 27 is pulled out (to the left as shown in FIG. 1b) so that wrench 24 is retracted into bore 21. Threaded portion 20a of the connector head is then screwed into threaded bore 11a of the valve, until seal 20b is compressed. An evacuating or fluid charging hose is connected to threaded portion 23a of fitting 23. Knob 27 is pushed until wrench 24 enters the socket in socket end 12a of setscrew 12. As knob 27 is turned counterclockwise, setscrew 12 backs out and uncovers the end of bore 13. A fluid passageway then exists from bore 13 to bore 22, and includes the space around ball end 12b of setscrew 12, slot(s) 12c, and bore 21. In the case in which the valve of FIG. 1a is used with a refrigeration system, vacuum may be pumped through this passageway, and refrigerant may be charged therethrough. For a hydraulic system, liquid may be put through the passageway, or air may be bled off therethrough. When the desired evacuation, charging, or whatever is completed, knob 27 is turned clockwise to seat end 12b of setscrew 12 in bore 13. Although not previously mentioned, for best results flange 10 and setscrew should be of materials of different hardnesses. For example, 10 may be made of brass or aluminum and 12 of steel. Alternatively, 10 may be steel also, but with a soft seat (not shown) on the end of bore 13 adjacent setscrew 12. When ball end 12b is seated, a metal-to-metal seal is established, and the connector head may be removed. This is done by removing whatever hose was connected to fitting 23, pulling knob 27 out, and unscrewing the head from the valve. Plug 17 is then inserted to seal 11a against atmospheric contamination.

Figure 2A:
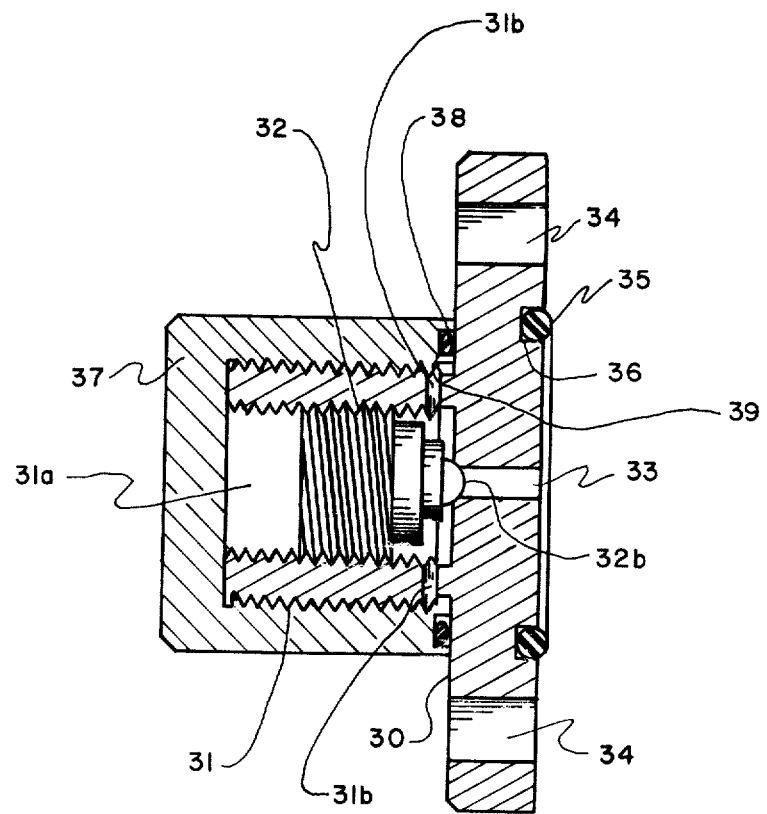
FIG. 2a shows sectional view of the valve for the other embodiment of the invention.

FIGS. 2a and 2b show another embodiment of the invention, with FIG. 2b' showing a slight variation of FIG. 2b. The valve of FIG. 2a is somewhat similar to the valve of FIG. 1a in that it has flange 30, boss 31, bore 31a, setscrew 32, bore 33, bores 34, seal 35, and groove 36 corresponding to respective elements 10, 11, 11a, 12, 13, 14, 15, and 16 of FIG. 1a. However, setscrew 32 has no slots thereon, and boss 31 is threaded outside as well as inside, approximately radial holes 31b are bored through the wall of boss 31. When the valve is in use, cap 37 with seal 38 in groove 39 is screwed onto 31. FIG. 2b has elements such as body 40, with (threaded) bore 41, bore 42, fitting 43, wrench 44, shaft 45, knob 46, seal 47 in groove 48 generally corresponding to respective elements 20, 21, 22, 23, 24, 25, 27, 28, and 29 of FIG. 1b. However, bore 41 is of the correct size to screw onto the outside of boss 31 in FIG. 2a. Moreover, annular grooves 49 and 50 are longitudinal grooves 51 and 52 are formed through the threads of bore 41. The connector head of FIG. 2b is used with the valve of FIG. 2a substantially the same as FIG. 1b is used with FIG. 1a. Cap 37 is removed, knob 46 is pulled out, body 40 is threaded onto boss 31, and a charging or evacuating hose is connected to portion 43a of fitting 43. Knob 46 is then pushed in to allow wrench 44 to enter the socket in end 32a of setscrew 32. When knob 46 is turned counterclockwise, setscrew 32 moves away from bore 33 and unseals the end thereof. A fluid passageway is thus defined from bore 33 to bore 42 and includes bores 31b, and grooves 49, 50, and 51. Evacuation or charging may then be performed; when finished, knob 46 is turned clockwise to seat setscrew 32, is then pulled outward, the hose connected to fitting 43 is removed, the connector head is unscrewed from boss 41, and cap 37 is screwed onto 41. FIG. 2b', instead of having grooves 49, 51, and 52, as in FIG. 2b, has groove 50' corresponding to 50. Communicating with 50' are bores 60, 61, and 62 that provide a passageway from bores 31b to fitting 43'.

We claim:

1. A fluid system valve and connector head combination including: a valve fitting adapted for permanent connection to said fluid system and a connector head adapted for temporary connection to said valve fitting, wherein said valve fitting includes:

a flange portion and a boss portion, a threaded longitudinal bore through said boss portion, a smooth longitudinal bore through said flange portion, communicating and coaxial with said threaded bore, but of less diameter, a set screw in said threaded bore having a ball point end and a socket end, wherein the ball point is of greater diameter than said smooth bore and whereby, when said set screw is seated, said ball point blocks said smooth bore, and means defining a fluid passageway through said boss portion from said smooth bore when said ball point is unseated;

wherein said connector head includes:

a body adapted for threadably attaching to said boss portion of said valve fitting, a fluid passageway in said body communicating with the fluid passageway of said valve fitting, and a set screw wrench in said body with means partly external to the body for operating said wrench both in rotation about and translation along the longitudinal axes of said body and said boss portion of said valve fitting; wherein said body of said connector head is hollow and is internally threaded and said boss portion is externally threaded whereby said head screws onto said boss and said means defining includes at least one bore through the wall of said boss, and said fluid passageway of said body includes at least one groove in said body so that said one bore and said one groove will be in alignment with one another and in fluid communication when said head is fully screwed onto said boss, and further wherein said means partly external includes a longitudinal shaft attached to said wrench and with a portion extending outside said body, and a manipulating knob on the portion of said shaft outside said body.

* * * * *